US008045780B2

(12) United States Patent
Boese et al.

(10) Patent No.: US 8,045,780 B2
(45) Date of Patent: Oct. 25, 2011

(54) DEVICE FOR MERGING A 2D RADIOSCOPY IMAGE WITH AN IMAGE FROM A 3D IMAGE DATA RECORD

(75) Inventors: Jan Boese, Eckental (DE); Matthias John, Nürnberg (DE); Norbert Rahn, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 1062 days.

(21) Appl. No.: 11/904,583

(22) Filed: Sep. 27, 2007

(65) Prior Publication Data

US 2008/0137924 A1      Jun. 12, 2008

(30) Foreign Application Priority Data

Sep. 29, 2006   (DE) .................. 10 2006 046 735

(51) Int. Cl.
*G06K 9/00*       (2006.01)
(52) U.S. Cl. ...................................... 382/131
(58) Field of Classification Search .............. 382/128, 382/130, 131, 132; 128/922; 378/4, 6, 21, 378/23, 28, 42, 46, 190; 250/363.04
See application file for complete search history.

(56) References Cited

U.S. PATENT DOCUMENTS

| | | | | |
|---|---|---|---|---|
| 5,951,475 | A * | 9/1999 | Gueziec et al. | 600/425 |
| 6,711,433 | B1 * | 3/2004 | Geiger et al. | 600/431 |
| 6,856,827 | B2 * | 2/2005 | Seeley et al. | 600/426 |
| 7,432,924 | B2 * | 10/2008 | Ohishi | 345/419 |
| 7,596,254 | B2 * | 9/2009 | Liebschner et al. | 382/128 |
| 2005/0251028 | A1 * | 11/2005 | Boese et al. | 600/425 |
| 2006/0184006 | A1 * | 8/2006 | Chen et al. | 600/416 |
| 2007/0060792 | A1 * | 3/2007 | Draxinger et al. | 600/117 |

OTHER PUBLICATIONS

Siemens Medical Solution, "syngo iPilot—Effective guidance during interventional procedures", Nov. 2005, Order No. A91AX-20004-11C1-76, pp. 1-2.

Yuya Iwakiri et al., "Fast Texture Mapping of Photographs on a 3D Facial Model", Image and Vision Computing New Zealand, Massey University Palmerston North, Nov. 26-28, 2003, pp. 390-395.

* cited by examiner

*Primary Examiner* — Jason M Repko
*Assistant Examiner* — Shervin Nakhjavan

(57) ABSTRACT

The invention relates to a device for merging a 2D radioscopy image with an image obtained from a 3D image data record, having a memory unit that stores the 2D radioscopy image and the 3D image data record, a segmentation unit that segments an inner surface of a hollow organ from the 3D image data record, a registration unit that registers the 2D radioscopy image with the 3D image data record, a back-projection unit that back-projects the pixels of the 2D radioscopy image onto the segmented surface, taking account of the projection geometry of the 2D radioscopy image and the registration, and an image merger unit that generates a virtual endoscopy view of the surface from the segmented surface using the back-projected pixels. The device primarily allows 2D radioscopy images to be superimposed during interventional procedures with a fly display of the interior of an interesting organ.

6 Claims, 4 Drawing Sheets

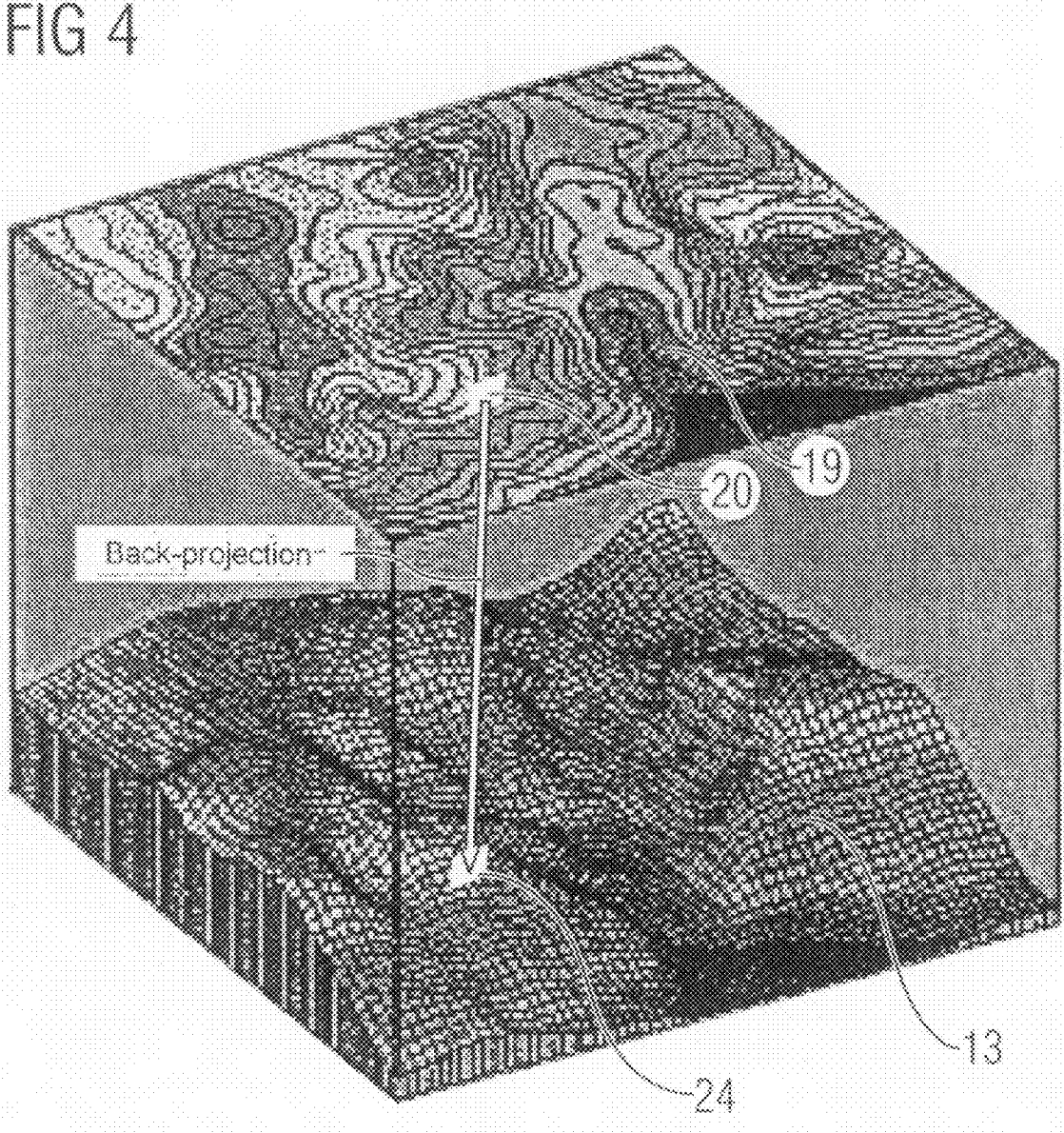

US 8,045,780 B2

DEVICE FOR MERGING A 2D RADIOSCOPY IMAGE WITH AN IMAGE FROM A 3D IMAGE DATA RECORD

CROSS REFERENCE TO RELATED APPLICATIONS

This application claims priority of German application No. 10 2006 046 735.3 filed Sep. 29, 2006, which is incorporated by reference herein in its entirety.

FIELD OF THE INVENTION

The present invention relates to a device for merging a 2D radioscopy image with an image obtained from a 3D image data record, with a memory unit in which data from the 2D radioscopy image and from the 3D image data record obtained via an input interface of the device can be stored, a registration unit that registers the 2D radioscopy image with the 3D image data record, a segmentation unit that segments a surface to be displayed of an interesting structure from the 3D image data record and an image merger unit that merges the 2D radioscopy image with the segmented surface and generates an image display that gives the impression of a 3D image.

BACKGROUND OF THE INVENTION

Such devices are primarily used in interventional or surgical procedures in which one or more 2D radioscopy images of the interesting area of the patient are recorded and displayed using x-ray fluoroscopy, for example in interventional radiological procedures, in interventional electrophysiological procedures or in procedures in interventional cardiology.

A frequent problem in these procedures is the spatial orientation of the doctor performing the procedure. Fluoroscopy images not only have the disadvantage of being limited to two-dimensional imaging, but—unless a contrast agent is used—only provide relatively little information as regards tissue structures. Soft tissue structures in particular cannot be mapped in fluoroscopy images, or only insufficiently. For this reason so-called image merger methods are already used, in which three-dimensional (3D) image data is combined with the fluoroscopy images and displayed together. The 3D images can for example be image data from computer tomography, magnetic resonance tomography or 3D rotation angiography, which were recorded from the area of interest of the examination object. These image merger methods are also known as 3D superimposition, 2D-3D superimposition, 2D-3D registration or 3D roadmapping. A prerequisite for joint or superimposed image display is however a correspondence in the perspective and scaling of the superimposed images.

Until now only really simple display methods are known. Thus in the "iPilot" product from Siemens, which is shown for example in the flyer "syngo iPilot—Effective guidance during interventional procedures", 2005/11, Siemens Medical Solutions, Order No. A91AX-20004-11C-1-76, the display takes place for example in the following steps. A two-dimensional view is generated from the 3D data record by means of volume rendering and creates the impression of a 3D image, so-called perspective volume rendering being employed which uses precisely the geometry of the x-ray system as mapping geometry for recording the x-ray fluoroscopy image. The x-ray focus here corresponds to the eye and the detector of the image plane. Following this each pixel of the two-dimensional volume rendering display can be assigned a pixel of the fluoroscopy image. The two images are mixed to create a joint image display, i.e. it is possible to cross-fade between the two images.

In most angiography systems however the cone angle of the x-ray geometry is relatively small and generally lies only between 10 and 20°, so that the corresponding perspective volume rendering looks very similar to the volume renderings usually created in parallel geometry. This usual volume rendering does not represent the optimum display method for some applications. In particular for displaying hollow organs another display method has become common, known as virtual endoscopy, also called fly display. In virtual endoscopy the eye of the observer is directed to the inside of the object and a perspective geometry with a very large viewing angle of typically 90° to 180° is selected. This type of display produces a very natural effect primarily for electrophysiological procedures and is the preferred method, for example for observing the pulmonary vein orifices.

However, a problem arises if such virtual endoscopy views are to be merged with 2D radioscopy images, especially with fluoroscopy images. A simple superimposition as in the past is not possible, because the mapping geometry is different and hence there is no direct referencing between two points in the two images.

SUMMARY OF THE INVENTION

The object of the present invention is to specify a device for image merging, with which among other things virtual endoscopy images can be merged with 2D radioscopy images and displayed jointly.

The object is achieved with the device and a method as claimed in the independent claims. Advantageous embodiments of the device form the subject matter of the subclaims or can be taken from the following description and the exemplary embodiment.

The proposed device to merge a 2D radioscopy image with an image obtained from a 3D image data record includes, in a manner known per se, a memory unit, in which data from the 2D radioscopy image and from the 3D image data record obtained via an input interface of the device can be stored, a registration unit that registers the 2D radioscopy image with the 3D image data record, and a segmentation unit that segments a surface to be displayed of an interesting structure from the 3D image data record.

The special feature of the present device is a back-projection unit that back-projects pixels of the 2D radioscopy image taking into account the projection geometry of the 2D radioscopy image and the registration to the segmented surface. In an image merger unit an image display giving the impression of a 3D image is then generated from the segmented surface using the back-projected pixels. In the case of image display this is preferably a rendered fly display of the surface in the case of an inner surface of a hollow organ as a surface to be displayed. Obviously however other display options can also be implemented with the image merger unit, for example a VRT (Volume Rendering Technology) display or an SSD (Surface Shaded Display) display of the surface.

The result is an image which on the one hand shows the 3D anatomy of the structure, for example of an organ, and on the other hand a radioscopy image, in particular x-ray image, projected thereon—onto this structure. The radioscopy image is primarily used to display interventional instruments. As long as the instrument is inside the organ a projection of the instrument on the internal wall of the organ is displayed in the image displayed. It is true that the three-dimensional position cannot be determined directly from this, since a deviation arises as a result of the back-projection if the direction of view does not correspond exactly to the angulation in the recording of the 2D radioscopy image. If however the instrument approaches the internal wall, this deviation becomes increasingly small. When the instrument finally comes in contact with the wall, the displayed and the actual position of the instrument correspond exactly. This is a particular advantage in the case of electrophysiological procedures, since ablation occurs during contact with the wall.

The device allows real-time x-ray images to be optimally combined with endoscopically displayed 3D data or alternatively displayed 3D data using parallel or perspective SSD or VRT. In this way procedures can be performed potentially faster, more safely and with less use of x-rays.

The present device is primarily designed to merge and display 2D x-ray radioscopy images with segmented surface images from 3D image data records. Of course the method can however also be used for merging other radioscopy images with those from surfaces obtained from 3D image data records.

BRIEF DESCRIPTION OF THE DRAWINGS

The proposed device and the functionality of the individual units of the device are explained again in greater detail below on the basis of an exemplary embodiment in conjunction with the drawings. These show:

FIG. 4 another illustration to clarify the back-projection of the pixels of the 2D fluoroscopy image onto the segmented surface.

DETAILED DESCRIPTION OF THE INVENTION

Preferably the proposed device is part of a C-arm device, with which 2D fluoroscopy images can be recorded during an interventional action on a patient. The device, which can for example be implemented in the image processor of the C-arm device, is here connected to an image display unit, for example a monitor, on which the merged images are displayed.

Figure 1:
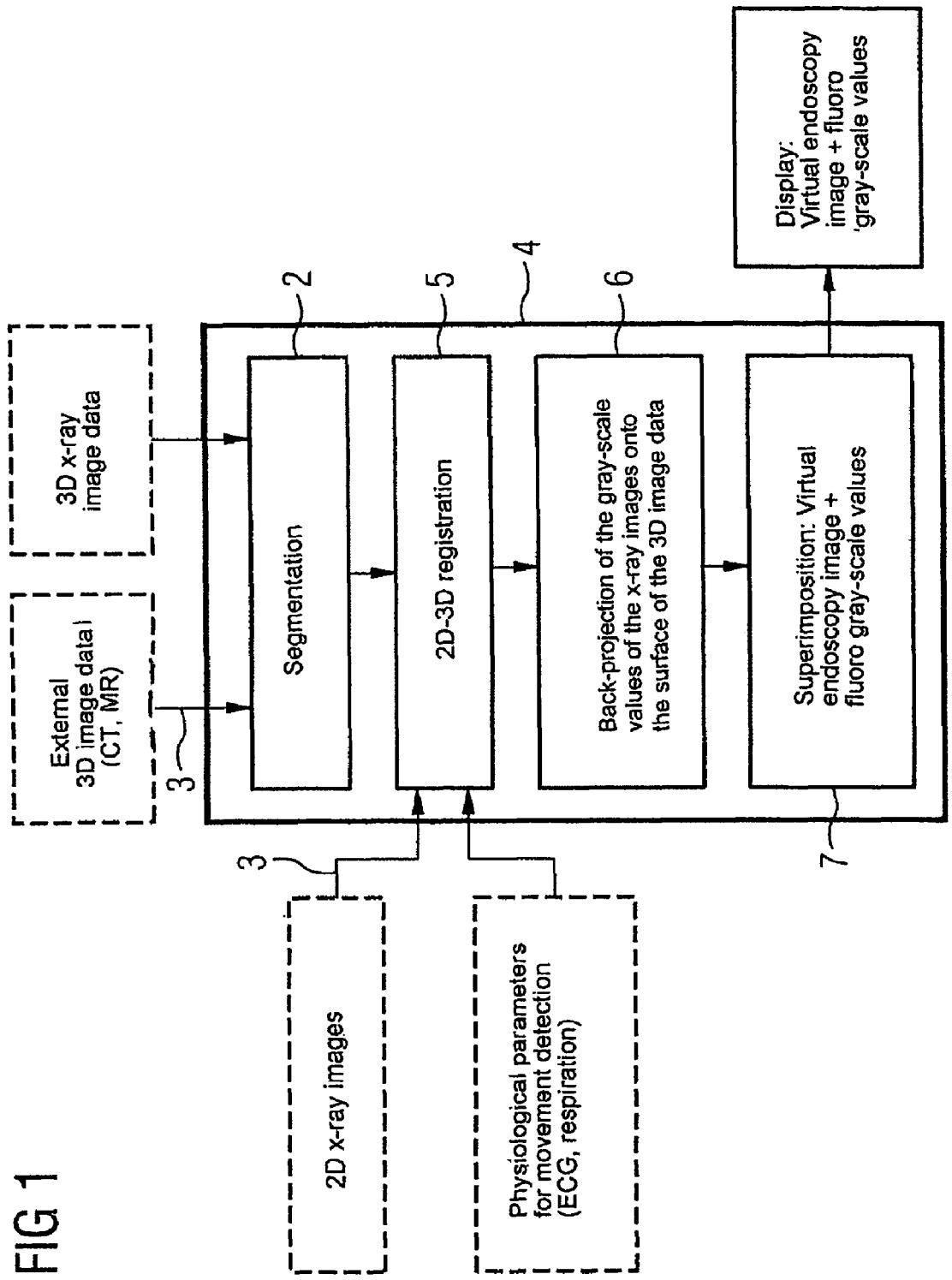
FIG. 1 a diagrammatic overview of an exemplary structure of the proposed device.

FIG. 1 shows in diagrammatic form an example of the structure of the proposed device. The device 4 has the following essential components in the example illustrated: a segmentation unit 2, a registration unit 5, a back-projection unit 6 and an image merger unit 7.

The segmentation unit 2 is designed for preprocessing the 3D image data which is fed to a memory unit (not illustrated) of the device via an interface 3. The 3D image data originates from a 3D imaging method such as, for example, a method of magnetic resonance tomography or computer tomography or was recorded by means of 3D angiography. In the segmentation unit 2 the interesting structure in each case, for example a blood vessel, a heart chamber, a bronchial tree, an aneurysm or a tumor, is segmented in the 3D image data and thus a three-dimensional surface of the interesting structure is determined.

In the registration unit 5 images are registered between the coordinates system of the 2D x-ray image and of the 3D image data record. Depending on the origin of the 3D image data record access can also be had here to calibration information, as is the case for example in 3D angiography. The 3D angiography can be performed with the same C-arm device with which the 2D fluoroscopy imaging is also performed. In this way the registration information is already available thanks to the calibration of the C-arm device. Furthermore it is of course possible to perform an automatic or manual image-based registration. Suitable registration algorithms and registration methods, for example using artificial or natural markers, are known to the person skilled in the art. In the case of manual image registration the registration module here makes options available via a graphical user interface with which the user can perform manual image registration on a monitor. In the case of organs in motion such as the heart, it may also be necessary to refresh the registration information regularly. This is then likewise done automatically in the registration unit. The registration unit can here also be fed physiological parameters on movement detection, for example, ECG or breathing.

Figure 2:
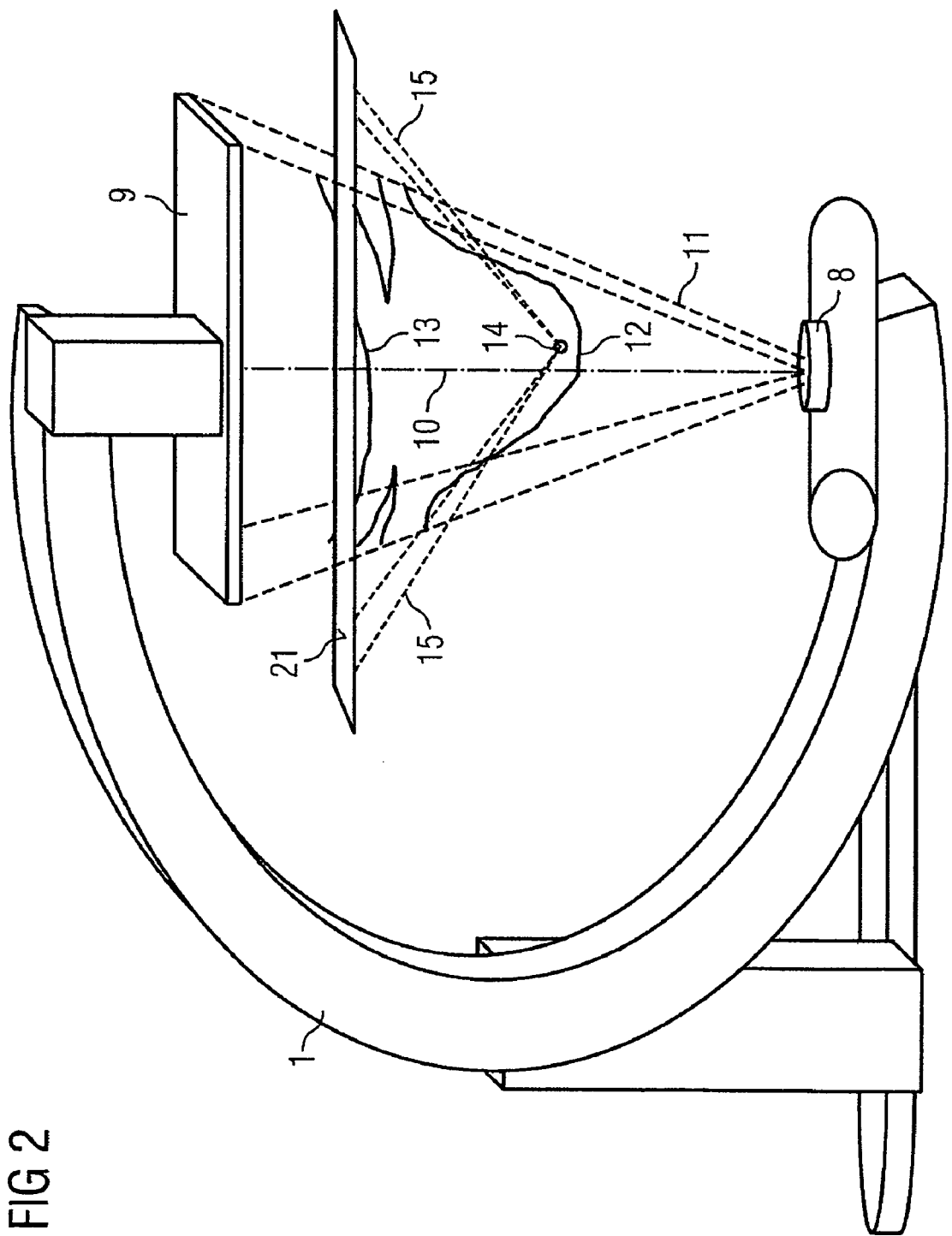
FIG. 2 a diagrammatic illustration of the mapping geometry in 2D fluoroscopy and virtual endoscopy.

FIG. 2 shows the problem in image merging with an x-ray C-arm device 1, only sections of which are illustrated. When recording a 2D fluoroscopy image of an object mounted between the x-ray detector 9 and the x-ray tube 8 the projection geometry of the x-ray system is fixed by the central beam 10 and the x-ray cone occurring at a defined angle of aperture on the x-ray detector 9, said cone being limited by the edge beams 11 indicated in the figure.

If, as in the present example, a heart chamber is segmented as an interesting structure on the other side, and if a wall 13 of the heart chamber 12 is to be represented in a fly display, the geometric ratios indicated in FIG. 2 arise. For the fly display the viewing point 14 lies within the heart chamber. The display is fixed by the angle of aperture and the viewing direction, as is likewise indicated by the limit lines 15 of the projection. The projection area 21 in the fly display does not here correspond to the projection area of the 2D radioscopy image which is predetermined by the x-ray detector. Since the mapping geometries of the 2D x-ray image and of the fly display are completely different, the two displays cannot be superimposed in the normal manner.

In the present device 4 a back-projection unit 6 is now provided, which back-projects each point of the 2D x-ray image onto the segmented surface. This is made clear on the basis of FIGS. 3 and 4, the geometry of the x-ray system and the registration information being taken into account. Projection or back-projection here means that each x-ray beam is tracked from the detector 9 to the x-ray tube 8 during 2D image recording, until it intersects the segmented surface 13. The point of intersection is then assigned the gray-scale value of the x-ray image. The result is a three-dimensional surface in which the surface points are assigned gray-scale values from the 2D x-ray image. Typically not all surface points from the 3D image data record are met. The missing surface points can then be supplemented at least partially by interpolation or extrapolation procedures.

Figure 3:
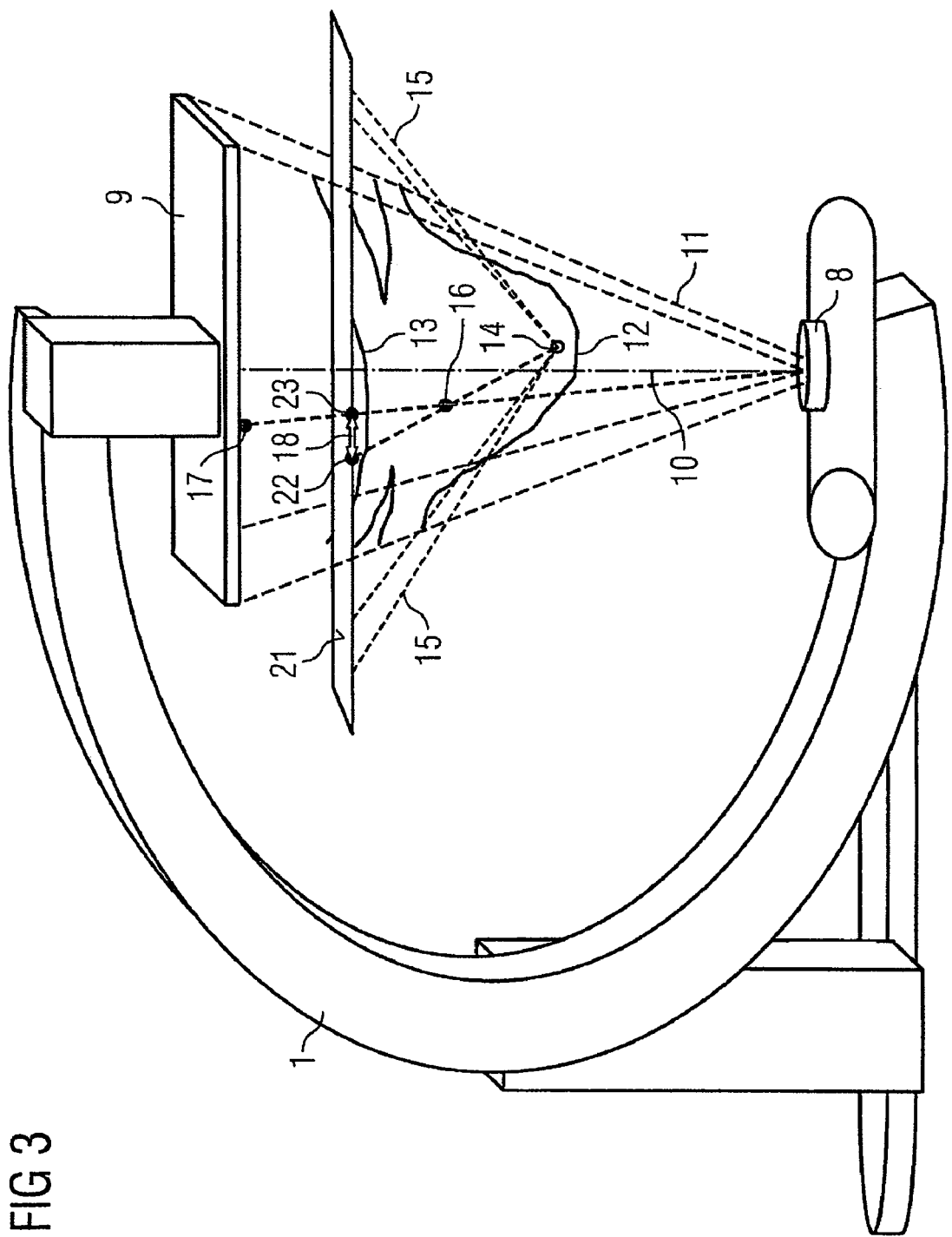
FIG. 3 a diagrammatic illustration to clarify the back-projection in the back-projection unit.

FIG. 3 here uses the example of the display of a catheter 16 to show the procedure during back-projection. The catheter 16 generates one or more pixels 17 in the image plane of the 2D x-ray image, i.e. the plane of the x-ray detector 9. These pixels are projected onto the segmented surface 13 by back-projection along the x-ray beam between the x-ray detector and the pixels which run through the catheter, and are assigned to the one or more corresponding surface pixels from the 3D image data record. The projection in accordance with the desired image display, in the present example a fly display, then takes place in the image merger unit 7. In this projection the image range is projected with the pixels of the catheter on the surface into the image plane of the fly display, as can be seen in FIG. 3. Since the catheter is at a distance from the segmented surface, it is displayed in the fly display because of the back-projection at a position 23 differing from the correct position 22. The difference is shown in FIG. 3 by arrow 18. This mapping error is however tolerable, since the position of the catheter is generally not of interest until immediately before a wall is touched. The smaller the distance between the catheter 16 and the displayed surface 13, the less is the deviation obtained with the method.

FIG. 4 shows another illustration of the back-projection used in the present device. In the top part of the 2D radioscopy image 19 it can be seen that the projection should be onto the segmented 3D surface 13. In this example only one parallel projection is shown for clarity instead of the perspective projection provided for in the present device. A representative pixel 20 of the 2D radioscopy image 19 is here back-projected onto the 3D surface 13 and is displayed on this surface as a gray-scale value 24 corresponding to the pixel of the original 2D radioscopy image.

In the image merger unit 7 shown in FIG. 1, a merged image is generated from the back-projected image data and the segmented surface. The known methods of surface display are used here, with the difference that in addition the back-projected x-ray image is included in the image display as a brightness value. In this way it is possible to display a 2D x-ray radioscopy image with a fly display of a 3D data record. This has already been explained on the basis of FIG. 3. In this fly display or endoscopic view display the gray-scale values of the 2D x-ray image are projected onto the surface displayed in the fly display, i.e. merged with the fly display. Besides the x-ray projection geometry for recording the 2D radioscopy image and the registration information, the variable display parameters of the fly display are also taken into account here in the image display. This primarily relates to the angle of aperture, the viewing point and the viewing direction.

In the same way for example a 2D x-ray radioscopy image can be superimposed with a VRT or SSD display of the 3D image data record. Besides parallel 3D displays, perspective 3D SSD and VRT displays are also possible in particular in the case of the present device. The gray-scale values of the x-ray image are projected onto the 3D surface displayed via SSD or VRT, for example the contrasted blood mass of a heart chamber, i.e. merged with the relevant 3D display. Here too, besides the x-ray projection geometry and the registration information the variable display parameters of the respective VRT or SSD display, in particular perspective, scaling and orientation, are taken into account during the projection or image display. In contrast to the known procedure, in the case of the present device a back-projection is performed and the corresponding display is generated on the basis of the back-projected data. In contrast, in the known merging methods, as briefly explained in the introductory description, only the image data from the 2D fluoroscopy image is superimposed on the corresponding display without any back-projection with the two-dimensional image display.

In certain geometric configurations it can occur that the superimposition is possible only with difficulty or makes little sense. Thus for example an orientation differing by 90° between viewing direction to the 3D data and central axis of the x-ray geometry for recording the 2D radioscopy image cannot provide a meaningfully merged display. In these special cases the device can additionally have a unit which asks the user to change the angulation of the C-arm for recording a suitable 2D radioscopy image, in order then with the help of the refreshed x-ray recording to generate a meaningful superimposed display.

The invention claimed is:

1. A device for merging a 2D radioscopy image with an image obtained from a 3D image data record, comprising:
   a memory unit that stores the 2D radioscopy image and the 3D image data record;
   a segmentation unit that segments a surface to be displayed from the 3D image data record;
   a registration unit that registers the 2D radioscopy image with the 3D image data record;
   a back-projection unit that back-projects pixels of the 2D radioscopy image onto the segmented surface taking account of a projection geometry of the 2D radioscopy image and the registration; and
   an image merger unit that generates a virtual endoscopy view of the surface from the segmented surface using the back-projected pixels,
   wherein a viewing point or an angle of aperture or a viewing direction of the image display do not correspond to a viewing point or an angle of aperture or a viewing direction of the 2D radioscopy image.

2. The device as claimed in claim 1, wherein the image merger unit generates an image display from the segmented surface using the back-projected pixels.

3. The device as claimed in claim 1, wherein the back-projection unit interpolates or extrapolates the back-projected pixels of the 2D radioscopy image that are between pixels of the segmented surface from the 3D image data record.

4. A method for merging a 2D radioscopy image with an image obtained from a 3D image data record, comprising:
   segmenting a surface to be displayed from the 3D image data record;
   registering the 2D radioscopy image with the 3D image data record;
   back-projecting pixels of the 2D radioscopy image onto the segmented surface taking account of a projection geometry of the 2D radioscopy image and the registration; and
   generating a virtual endoscopy view of the surface from the segmented surface using the back-projected pixels,
   wherein a viewing point or an angle of aperture or a viewing direction of the image display do not correspond to a viewing point or an angle of aperture or a viewing direction of the 2D radioscopy image.

5. The method as claimed in claim 4, wherein an image display is generated from the segmented surface using the back-projected pixels.

6. The method as claimed in claim 4, wherein the back-projected pixels of the 2D radioscopy image that are between pixels of the segmented surface from the 3D image data record are interpolated or extrapolated.

* * * * *